No. 657,817. Patented Sept. 11, 1900.
G. A. ENSIGN.
MACHINE FOR MAKING WOODEN DISHES.
(Application filed May 15, 1900.)
(No Model.) 5 Sheets—Sheet 1.

WITNESSES:
Edward Thorpe
Rev. G. Hostetz

INVENTOR
George A. Ensign.
BY Munn
ATTORNEYS

No. 657,817. Patented Sept. 11, 1900.
G. A. ENSIGN.
MACHINE FOR MAKING WOODEN DISHES.
(Application filed May 15, 1900.)

(No Model.) 5 Sheets—Sheet 2.

WITNESSES:
Edward Thorpe

INVENTOR
George A. Ensign.
BY
ATTORNEYS

No. 657,817. Patented Sept. 11, 1900.
G. A. ENSIGN.
MACHINE FOR MAKING WOODEN DISHES.
(Application filed May 15, 1900.)
(No Model.) 5 Sheets—Sheet 3.

WITNESSES:
Edward Thorpe

INVENTOR
George A. Ensign.
BY
ATTORNEYS

THE NORRIS PETERS CO., PHOTO-LITHO., WASHINGTON, D. C.

No. 657,817. Patented Sept. 11, 1900.
G. A. ENSIGN.
MACHINE FOR MAKING WOODEN DISHES.
(Application filed May 15, 1900.)

(No Model.) 5 Sheets—Sheet 4.

WITNESSES:
Edward Thorpe
Theo. Hoster

INVENTOR
George A. Ensign
BY
ATTORNEYS

No. 657,817. Patented Sept. 11, 1900.
G. A. ENSIGN.
MACHINE FOR MAKING WOODEN DISHES.
(Application filed May 15, 1900.)
(No Model.) 5 Sheets—Sheet 5.
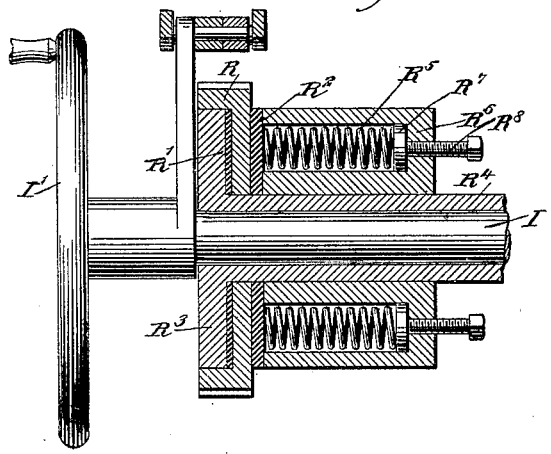
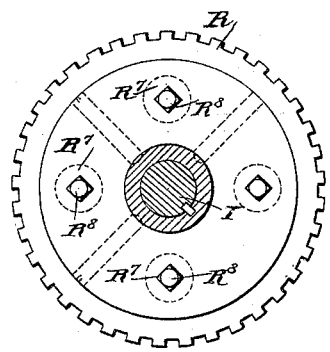
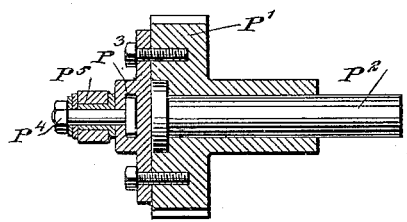
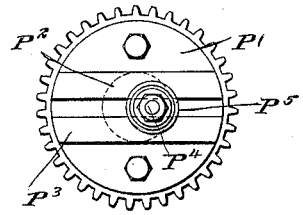
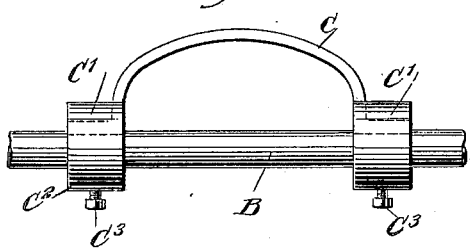
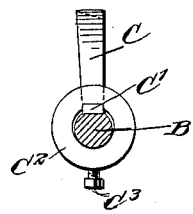
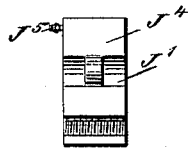
WITNESSES:
Edward Thorpe
INVENTOR
George A. Ensign.
BY
ATTORNEYS

UNITED STATES PATENT OFFICE.

GEORGE A. ENSIGN, OF DEFIANCE, OHIO, ASSIGNOR TO THE DEFIANCE MACHINE WORKS, OF SAME PLACE.

MACHINE FOR MAKING WOODEN DISHES.

SPECIFICATION forming part of Letters Patent No. 657,817, dated September 11, 1900.

Application filed May 15, 1900. Serial No. 16,762. (No model.)

*To all whom it may concern:*

Be it known that I, GEORGE A. ENSIGN, a citizen of the United States, and a resident of Defiance, in the county of Defiance and State of Ohio, have invented a new and Improved Machine for Making Wooden Dishes, of which the following is a full, clear, and exact description.

The invention relates to machines for cutting wooden dishes or plates from the face of an intermittently-fed block by means of a revolving hoop-shaped knife, the face of the block being trimmed for a new cut by a rotary facing-knife.

The object of the invention is to provide a new and improved machine for making concavo-convex wooden dishes which is comparatively simple and durable in construction and very effective and automatic in operation.

The invention consists of novel features and parts and combinations of the same, as will be fully described hereinafter and then pointed out in the claims.

Figure 1:
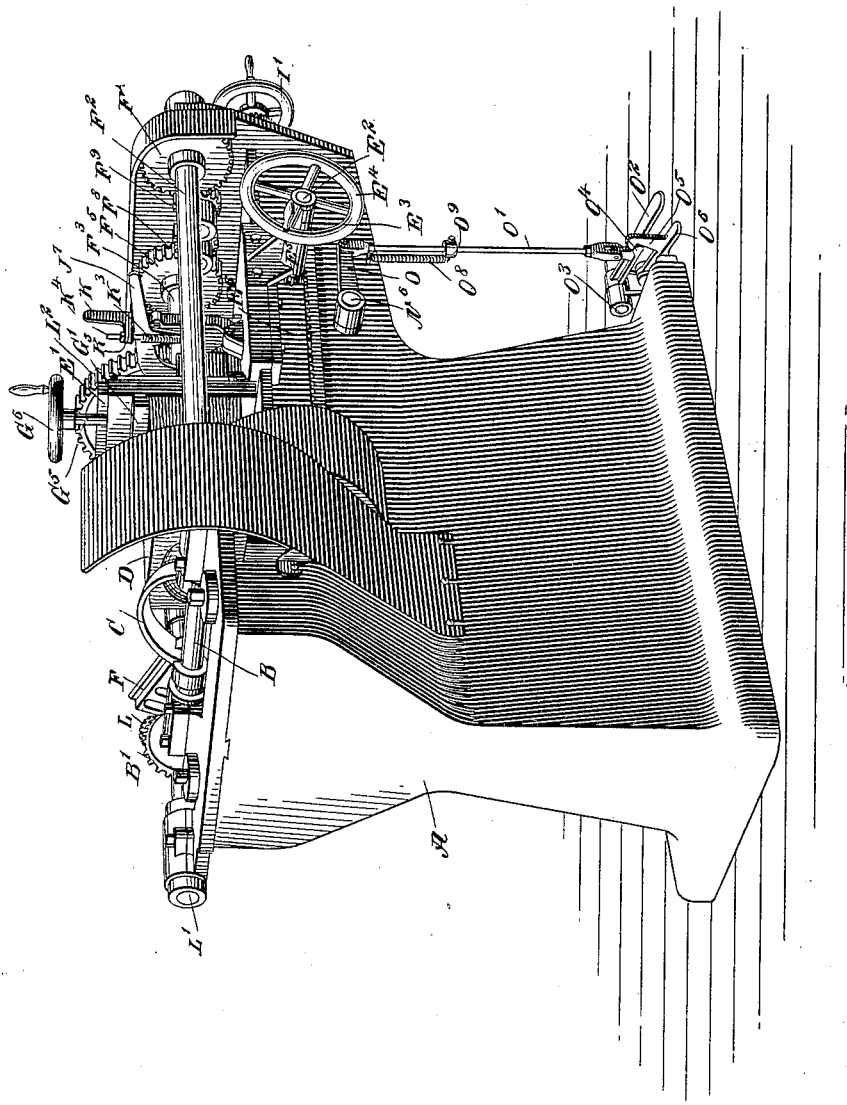
Figure 2:
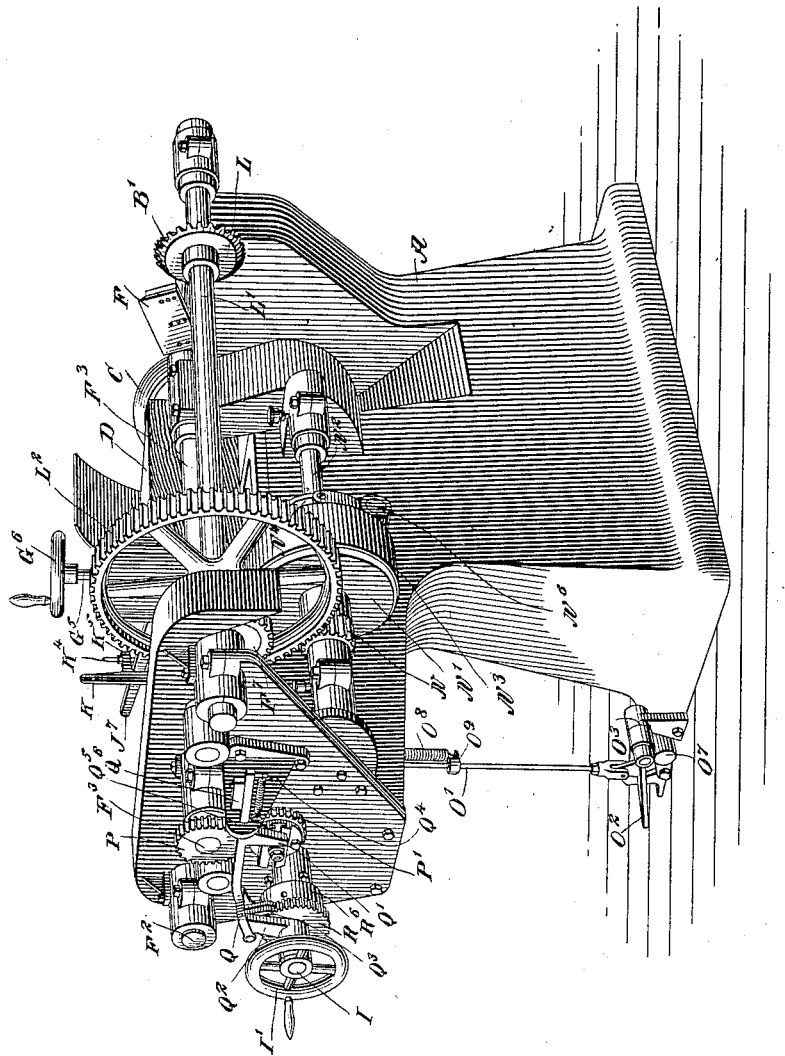
Figure 3:
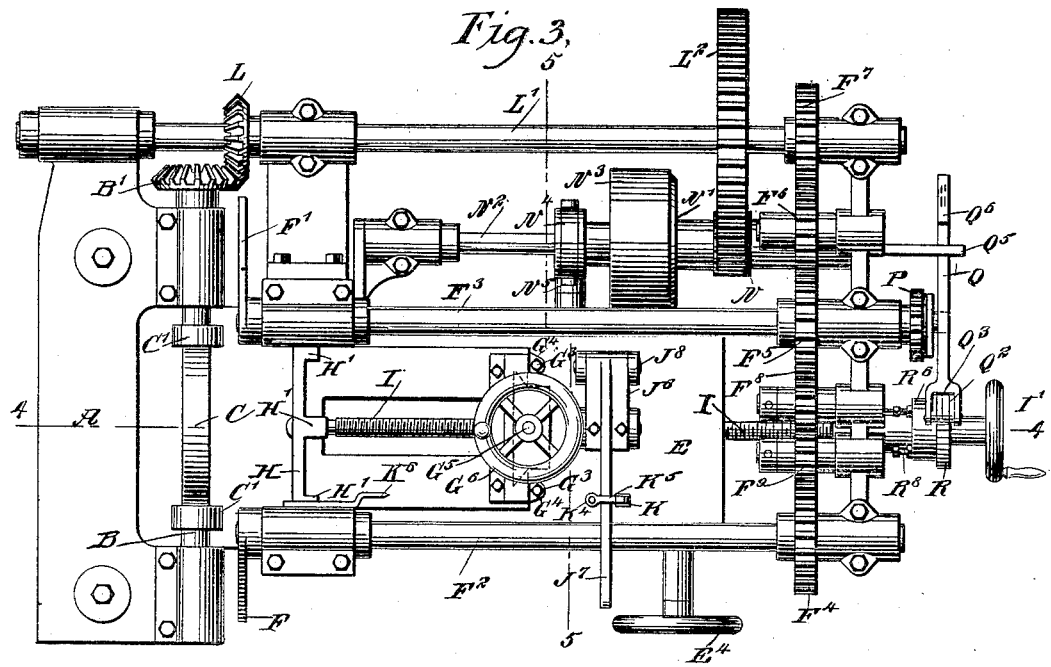
Figure 4:
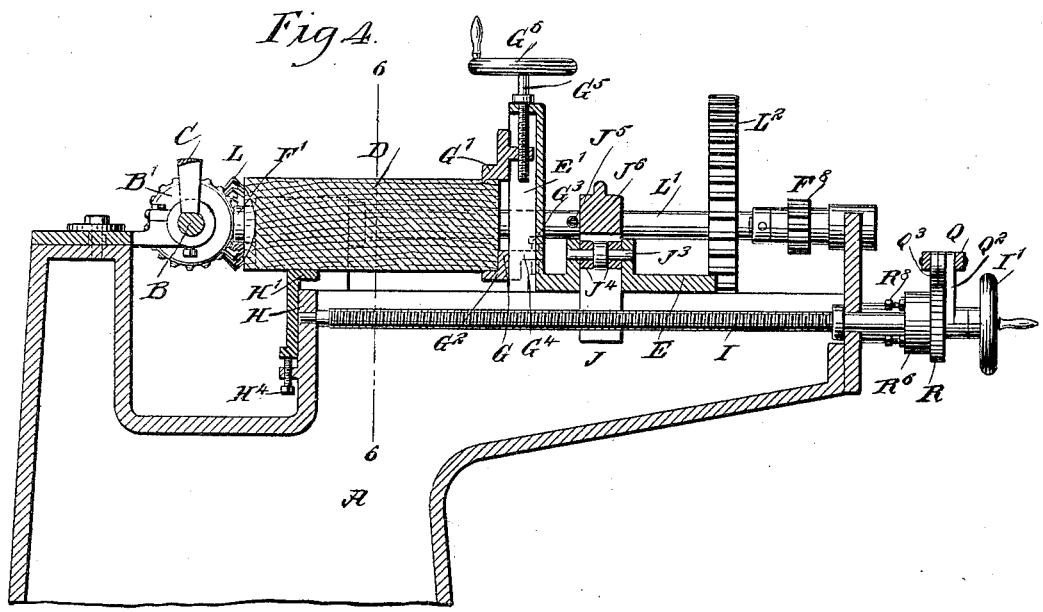
Figure 5:
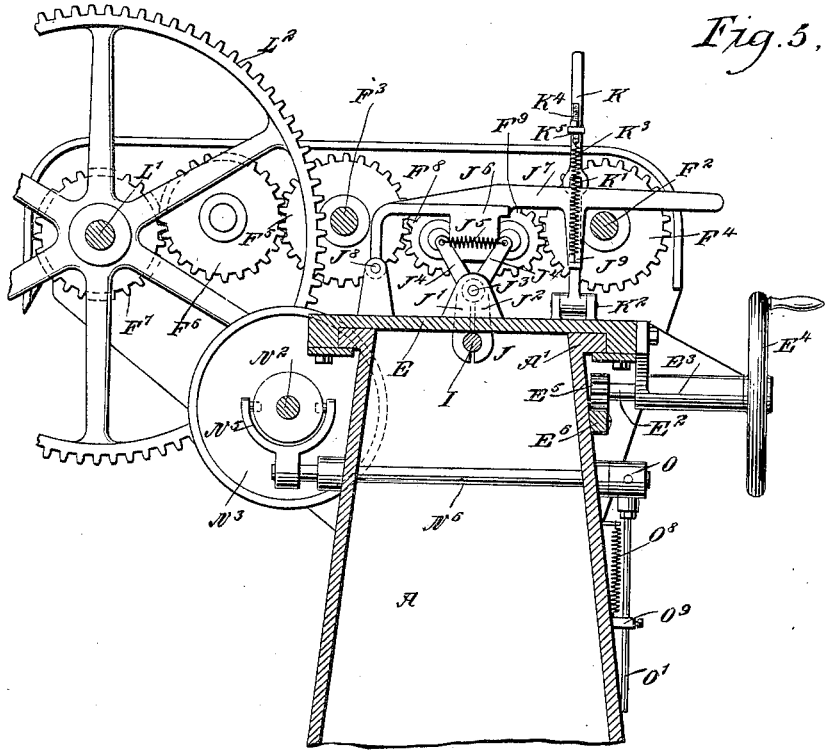
Figure 6:
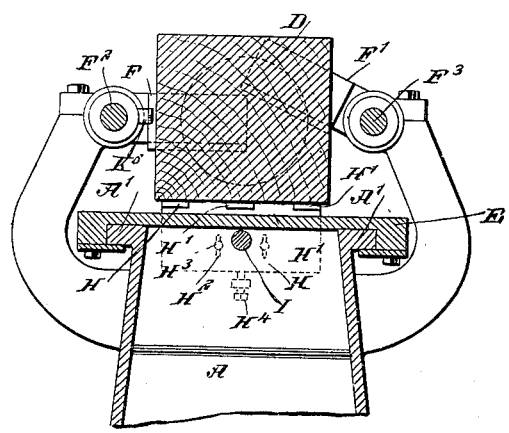

A practical embodiment of the invention is represented in the accompanying drawings, forming a part of this specification, in which similar characters of reference indicate corresponding parts in all the views Figure 1 is a front perspective view of the improvement. Fig. 2 is a rear perspective view of the same. Fig. 3 is a plan view of the same. Fig. 4 is a longitudinal sectional section of the same on the line 4 4 in Fig. 3. Fig. 5 is a transverse section of the same on the line 5 5 in Fig. 3. Fig. 6 is a similar view of the same on the line 6 6 in Fig. 4. Fig. 7 is an enlarged sectional side elevation of the safety friction-feed on the lead-screw. Fig. 8 is a rear face view of the same. Fig. 9 is an enlarged sectional side elevation of the part of the feed-screw for the friction-feed. Fig. 10 is a face view of the same. Fig. 11 is an enlarged end elevation of the oval knife and the means for clamping the same in place on its shaft. Fig. 12 is a sectional side elevation of the same, and Fig. 13 is an inner face view of one of the nut members for the lead-screw.

On the forward end of a suitably-constructed frame A is journaled a transverse shaft B, carrying an oval knife C for cutting at every revolution of the said shaft a concavo-convex dish from the end of a wooden block D, intermittently fed forward by a carriage E and trimmed at its forward face by facing-knives F F' immediately after a dish is cut out, said facing-knives F F' rotating in unison and operating successively on the block D, each knife trimming about one-half of the face of the block at each operation.

The carriage E is mounted to slide longitudinally on suitable guideways A', formed on the main frame A, as is plainly shown in Fig. 6, and on said carriage E is formed a vertically-disposed guideway E', in which are mounted to slide vertically jaws G G' for clamping the rear end of the block of wood in position, so that when the carriage E is moved forward the block is pushed along, the forward end of the block sliding over horizontally-disposed flanges H', formed on a supporting-plate H, held vertically adjustable on the frame A, as is plainly indicated in Figs. 4 and 6. For this purpose the supporting-plate H is provided with elongated slots $H^2$, engaged by bolts $H^3$ screwing in the main frame, a supporting-screw $H^4$ engaging the bottom of said plate to hold the latter in position after proper adjustment is made. The rear lower end of the block D rests on horizontally-disposed flanges $G^2$, carried by the lower jaw G and in alinement with the flanges H', and as the said jaw G and the supporting-plate H are vertically adjustable it is evident that the block D can be brought in proper position—that is, with its longitudinal center intersecting the axis of the knife-shaft B, as will be readily understood by reference to Fig. 4. The lower jaw G is held vertically adjustable by screw-rods $G^3$ screwing in lugs $G^4$ on said jaw and abutting with their lower ends on the carriage E. The upper jaw G' can be raised or lowered by means of a screw-rod $G^5$ in the guideway E' and having a hand-wheel $G^6$ adapted to be turned by the operator to raise or lower the said jaw G' for securely clamping the block in place and for allowing the insertion of a new block when one is used up.

The carriage E can be fed forward and backward by hand to allow of placing a new block in position and to feed the block forward in proper position for cutting by the knives C and F F'. The hand-feed consists, essentially, of a transverse shaft $E^2$, (see Figs. 1 and 5,) journaled in a bearing $E^3$, attached to the carriage E, a hand-wheel $E^4$ being secured on the outer end of the shaft and under the control of the operator. On the forward end of the shaft is secured a gear-wheel $E^5$ in mesh with a longitudinally-extending rack $E^6$, secured to one side of the frame A, as is plainly indicated in said figures. Now by the operator turning the hand-wheel $E^4$ a forward or backward feed is given to the carriage E by the mechanism described, according to the direction in which said hand-wheel is turned.

In order to impart an intermittent motion to the carriage E, a longitudinally-extending lead-screw I is provided, journaled in suitable bearings in the frame A and adapted to be engaged by a nut J, consisting of two members $J'$ $J^2$, pivoted at $J^3$ on the carriage E and having upwardly and outwardly extending arms $J^4$ extending from the pivot members $J'$ $J^2$. The arms $J^4$ are connected by a spring $J^5$ for pulling the arms toward each other, so as to normally hold the members $J'$ $J^2$ out of engagement with the lead-screw I. The arms $J^4$ are adapted to be pressed apart by a wedge-shaped block $J^6$, extending transversely and fulcrumed at $J^8$ on the carriage E, as is plainly shown in Fig. 5, said block being provided with a hand-lever $J^7$, as shown in Figs. 3 and 5. When the hand-lever $J^7$ is moved downward by the operator to cause the block $J^6$ to swing the arms $J^4$ apart, so that the members $J'$ $J^2$ engage the lead-screw I, then the said lever $J^7$ is locked in this lowermost position by a pin $K'$ on a catch-arm K, extending upwardly and pivoted at its lower end $K^2$ on the carriage E. A spring $K^3$ is secured at its lower end to an extension-arm $J^9$ of the lever $J^7$, and the upper end of said spring is attached to a screw-rod $K^4$, adjustably held on a lug $K^5$, projecting from the upper portion of the catch-arm K. By the arrangement described the spring $K^3$ has a tendency to pull the catch-arm K over and engage the pin $K'$ with the upper edge of the said lever $J^7$ when the latter is pressed downward by the operator at the time it is desired to start the intermittent feed of the carriage E. The catch-arm K is adapted to abut against a stop-lug $K^6$, secured to the forward end of the main frame A, so that when the carriage E has reached a forward position and the last dish has been cut from the block D then a further forward movement of the carriage E causes the said stop-pin to impart a rearward swinging motion to the catch-arm K, so that the pin $K'$ moves out of engagement with the lever $J^7$, and the latter is immediately swung upward by the action of the spring $K^3$, so that the block $J^6$ moves upward out of engagement with the arms $J^4$ to allow the spring $J^5$ to open the members $J'$ $J^2$ of the nut J, so that further forward feeding of the carriage E ceases without stopping the intermittent motion of the lead-screw I.

In order to impart a continuous rotary motion to the shaft B, carrying the oval knife C, I provide the said shaft at one end with a bevel gear-wheel $B'$ in mesh with a bevel gear-wheel L, secured on a longitudinally-extending shaft $L'$, journaled in suitable bearings attached to one side of the frame A. On the shaft $L'$ is secured a gear-wheel $L^2$ in mesh with a pinion N, secured to or formed on a friction-disk $N'$, fastened on a shaft $N^2$, journaled in suitable bearings on one side of the frame A below the shaft $L'$, and said friction-disk $N'$ is adapted to be engaged by a friction-pulley $N^3$, mounted to turn and slide loosely on the shaft $N^2$, said pulley $N^3$ being connected by belt with other machinery for imparting a rotary motion to the pulley. The hub of the pulley $N^3$ is provided with a shifting collar $N^4$, engaged by a shifting fork $N^5$, secured on one end of a transverse shaft $N^6$, journaled in suitable bearings in the main frame A and provided with an arm O (see Fig. 1) pivotally connected by a link $O'$ with a treadle $O^2$, fulcrumed on a bracket $O^3$, attached to the base of the frame A, as indicated in Fig. 2. On the treadle $O^2$ is formed a lug $O^4$, adapted to be engaged by a hook $O^5$, held on a second treadle $O^6$, pivoted on a bracket $O^7$, likewise attached to the frame adjacent to the bracket $O^3$. A spring $O^8$, attached at its upper end to the frame A, (see Fig. 1,) is secured at its lower end to a collar $O^9$, adjustably held by a set-screw on the link $O'$, said spring serving to impart an upward-swinging motion to the link $O'$ when the treadle $O^2$ is unlocked from the hook $O^5$. When the operator presses the treadle $O^2$ downward, then the link $O'$ imparts a downward-swinging motion to the arm O to turn the shaft $N^6$ and to cause the shifting fork $N^5$ to impart a sliding motion to the friction-pulley $N^3$, so that the latter moves in frictional contact with the friction-disk $N'$ to rotate the latter, and consequently the pinion N, so that the rotary motion of the pinion is transmitted to the gear-wheel $L^2$ and the shaft $L'$ to impart a rotary motion to the gear-wheel $B'$ and rotate the shaft B, carrying the knife C. When the treadle $O^2$ is swung downward and the hook $O^5$ engages the lug $O^4$, so as to hold the treadle $O^2$ in a locked lowermost position, then the pulley $N^3$ is in mesh with the friction-disk $N'$. When it is desired to stop the rotary motion of the friction-disk $N'$ and pinion N and the parts driven thereby, then the operator presses the treadle $O^6$, so as to disengage the hook $O^5$ from the lug $O^4$ to allow the spring $O^8$ to pull the link $O'$ upward and move the friction-pulley $N^3$ out of mesh with the disk $N'$, as previously explained.

The two facing-knives F $F'$ receive a continuous rotary motion and for this purpose are fastened on longitudinally-extending shafts $F^2$ $F^3$, the knife F being set somewhat in advance of the knife F', so that the two knives cut successively on the face of the block, each knife cutting about one-half of the face of the block at each full revolution of said shafts. On the shafts $F^2$ $F^3$ are secured gear-wheels $F^4$ $F^5$, respectively, (see Fig. 5,) of which the gear-wheel $F^5$ is in mesh with an intermediate gear-wheel $F^6$ in mesh with a gear-wheel $F^7$ on the shaft L', so that when the latter is rotated a rotary motion is transmitted by the gear-wheels $F^7$ $F^6$ $F^5$ to the shaft $F^3$ and the rotary motion of the gear-wheel $F^5$ is transmitted by intermediate meshing gear-wheels $F^8$ $F^9$ to the gear-wheel $F^4$, so that both shafts $F^3$ $F^2$ are rotated in unison and in the right direction.

In order to impart an intermittent motion to the lead-screw I, the following device is provided: On the rear end of the shaft $F^3$ (see Figs. 2 and 3) is secured a gear-wheel P, in mesh with a gear-wheel P', mounted to rotate loosely on a stud $P^2$, carried by the rear end of the main frame A. On the outer face of the gear-wheel P' is secured a diametrically-extending guideway $P^3$, in which is adjustably held a stud $P^4$, carrying a friction-roller $P^5$, adapted to engage a projection Q' on an arm Q, pivotally connected at one end with a crank-arm $Q^2$, mounted to rotate loosely on the rear end of the lead-screw I, as indicated in Figs. 2 and 3. On the crank-arm $Q^2$ is held a pawl $Q^3$, in mesh with a ratchet-wheel R, forming part of a safety friction-feed for the lead-screw I. (See Figs. 7 and 8.) The web of the gear-wheel R is engaged on opposite faces by friction-disks R' $R^2$, preferably made of brass or other material, the disk R' abutting against the inner face of a collar $R^3$, having its hub $R^4$ secured to the lead-screw I, so that when the collar $R^3$ is rotated a rotary motion is given to said lead-screw I. The other friction-disk $R^2$ is pressed on by a plurality of springs $R^5$, fitted in recesses in a collar $R^6$, secured to the hub $R^4$ by set-screws or other means, and the tension of said springs $R^5$ is regulated by collars $R^7$, against which screw the inner ends of screws $R^8$, screwing in the collar $R^6$. It will be seen that when the gear-wheel R is rotated, the frictional contact of the web of this gear-wheel with the friction-disk R, caused by the action of the springs $R^5$ on the friction-disk $R^2$, causes a rotary motion of the collar $R^3$, and consequently of the lead-screw I. The continuous rotary motion of the shaft $F^3$ is transmitted by the gear-wheel P to the gear-wheel P', and as the friction-roller $P^5$ is eccentrically mounted relatively to the said gear-wheel P it is evident that at each revolution it imparts a sliding movement to the projection Q' to impart a similar movement to the arm Q and give a swinging movement to the crank-arm $Q^2$, which by the pawl $Q^3$ imparts an intermittent rotary motion to the said gear-wheel R, and the motion of the latter is transmitted by the safety friction-feed (previously described and shown in Figs. 7 and 8) to the lead-screw I.

The return movement of the arm Q is accomplished by a spring $Q^4$, connected to one end of the arm Q and secured at its other end to a bracket $Q^5$, attached to the rear end of the frame A and in which bracket the free end of the arm Q is mounted to slide freely. An adjustable stop $Q^6$ on the arm Q limits the return sliding movement of the said arm Q by the stop abutting against the bracket $Q^5$. On the rear end of the lead-screw I is secured a hand-wheel I' for turning the said lead-screw by hand and feeding the block forward or backward whenever it is deemed necessary to do so.

In Figs. 11 and 12 is illustrated a simple means for securing the oval knife C in position on the shaft B, the said knife being for this purpose provided at its ends with outwardly-extending alined flanges C', fitting in recesses in collars $C^2$, slipped on the shaft B and secured thereto by set-screws $C^3$, said flanges preferably resting with their inner faces on flattened parts of the shaft B, as will be readily understood by reference to Fig. 12, so that the knife is securely fastened in position on the shaft when said set-screws $C^3$ are screwed up. By loosening the set-screws $C^3$ and moving the collars apart the knife can be readily removed and a new or differently-shaped knife can be placed in position on the shaft and secured thereto in the manner described.

The operation is as follows: When the carriage E is in a rearmost position and the jaw G' is in an uppermost position and the flanges $G^2$ and H' are in alinement, then the block of wood D is placed in position on said flanges, the latter being adjusted so as to cause the longitudinal axis of the block to intersect the axis of the knife-shaft B. The operator now turns the hand-wheel $G^6$ so as to move the jaw G' downward, and thereby securely clamp the block of wood between the jaws G G'. The operator now turns the hand-wheel $E^4$ so as to move the carriage E, and with it the block D, forward until the front face of the block is in proper position for the knife C to make the first cut. When the several parts are now in this position, the operator presses down on the lever $J^7$ until the pin K' engages and locks the said lever against a return upward movement. The downward movement of the lever $J^7$ causes the block $J^6$ to move in contact with the arms $J^4$, so that the members J' $J^2$ of the nut J close upon the lead-screw I. The operator now presses the treadle $O^2$ until the latter is locked in position by the hook $O^5$, and this movement of the treadle $O^2$ causes the friction-pulley $N^3$ to move in frictional contact with the friction-disk N', so that the several shafts L' B $F^2$ $F^3$ are rotated to cause the knife C to swing and make a cut on the front face of the block D, and as soon as this knife has left the face of the block the facing-knives F F' make a cut to produce a new face in proper condition for the next cut by the knife C. As soon as the facing-knives F F' have left the block D the latter is fed forward the desired distance by the feed-screw I, being now turned to move the carriage E, and with it the block D, in a forward direction and the desired distance. This operation is repeated—that is, the knife C cuts out a dish from the face of the block—after which the latter is trimmed by the knives F F', and then the block is moved forward for another cut by the knife C. When the block is nearly used up, the arm K is tripped, as previously explained, to release the lever $J^4$ and to allow the spring $J^5$ to open the members $J'$ $J^2$ of the nut J, so that further turning of the lead-screw does not cause a further forward feeding of the carriage E.

If for any reason the parts just described fail to perform their various functions, the safety friction device (illustrated in Figs. 7 and 8) begins to function, so that the rotary motion given to the gear-wheel R is not transmitted to the shaft I; but the said gear-wheel R rotates loosely between the friction-disks $R'$ $R^2$. It is understood that should the lever $J^7$ not be tripped at the time the carriage E moves into a forward position then the flange $G^2$ by abutting against the flange $H'$ prevents further forward movement of the said carriage, and the friction-feed previously referred to begins to function, as above described, without danger of breaking any of the parts of the machine.

Having thus fully described my invention, I claim as new and desire to secure by Letters Patent—

1. A machine for cutting wooden dishes, comprising a curved revolving dish-knife, and a plurality of facing-knives for trimming the face of a wood block after the revolving dish-knife has cut a dish from the block, said facing-knives rotating in unison and being located one in advance of the other, substantially as shown and described.

2. A machine for cutting wooden dishes, comprising a curved revolving dish-knife, and a plurality of facing-knives for trimming the face of the wood block after the revolving dish-knife has cut a dish from the block, the said facing-knives rotating in unison, one knife being in advance of the other and each reaching approximately over one-half of the face of the block, substantially as shown and described.

3. A machine for cutting wooden dishes, comprising a curved revolving dish-knife, and a plurality of facing-knives mounted to rotate in unison, the facing-knives being located upon different sides of the dish-knife and extending about over one-half of the face of the block.

4. A machine for cutting wooden dishes, having a block-holding carriage, clamping-jaws on the said carriage for clamping the rear end of a wooden block, said jaws being adjustable in a vertical plane and a support for the forward end of the block, said support being adjustable in a plane parallel with the plane of adjustment of said jaws, substantially as shown and described.

5. In a machine for cutting wooden dishes, the combination with a revoluble curved dish-knife for cutting dishes from the forward face of a block, of a carriage for feeding the block forward and having clamping-jaws for holding the block, said jaws being adjustable at right angles to the knife-shaft and a support for the forward end of the block, said support being adjustable in a plane parallel with the plane of adjustment of the clamping-jaws the said support and jaws permitting adjustment of the block, to bring the latter in proper position relatively to said knife, as set forth.

6. A machine for cutting wooden dishes, provided with a safety friction device for the carriage lead-screw, consisting of an intermittently-rotating gear-wheel, friction-disks on opposite faces of said gear-wheel, a collar secured on the said lead-screw and engaged by the first-named friction-disk, a second collar having recesses, and springs set in the second collar and pressing the second friction-disk, substantially as shown and described.

7. A machine for cutting wooden dishes, provided with a safety friction device for the carriage lead-screw, consisting of an intermittently-rotating gear-wheel, friction-disks on opposite faces of said gear-wheel, a collar secured on the said lead-screw and engaged by the first-named friction-disk, a second collar having recesses, springs set in the second collar and pressing the second friction-disk, and means for adjusting the tension of the said springs, as set forth.

8. A machine for cutting wooden dishes, having an intermittent feeding device for the block-holding carriage, consisting of a revoluble wheel, a friction-roller held adjustably on the face of the said wheel, a lead-screw, a pawl-and-ratchet mechanism for the lead-screw, a friction device interposed between the ratchet and the lead-screw and a spring-pressed arm adapted to be engaged by the said friction-roller and connected with the said pawl-and-ratchet mechanism, substantially as shown and described.

9. A machine for cutting wooden dishes, having an intermittent feeding device for the block-holding carriage, consisting of a revoluble wheel, a friction-roller held adjustably on the face of the said wheel, a lead-screw, a pawl-and-ratchet mechanism for the lead-screw, a spring-pressed arm adapted to be engaged by the said friction-roller and connected with the said pawl-and-ratchet mechanism, and means for limiting the return movement of the said spring-pressed arm, as set forth.

10. A machine for cutting wooden dishes, having a shaft, collars surrounding the shaft and having portions spaced therefrom, and a curved knife provided with outwardly-extending flanges fitting between the collars and the shaft.

11. A machine for cutting wooden dishes, having a carriage for holding a wooden block, a lead-screw, a sectional nut for engaging the lead-screw and having its members pivoted on the carriage and formed with extension-arms, and a hand-lever fulcrumed on the carriage, and having a wedge-shaped block for engagement with the said arms, to close the nut members upon the lead-screw, substantially as shown and described.

12. A machine for cutting wooden dishes, having a carriage for holding a wooden block, a lead-screw, a sectional nut for engaging the lead-screw and having its members pivoted on the carriage and formed with extension-arms, a hand-lever fulcrumed on the carriage, and having a wedge-shaped block for engagement with the said arms, to close the nut members upon the lead-screw, and a locking device for the said hand-lever, and carried by the said carriage, substantially as shown and described.

13. A machine for cutting wooden dishes, having a carriage for holding a wooden block, a lead-screw, a sectional nut for engaging the lead-screw and having its members pivoted on the carriage and formed with extension-arms, a hand-lever fulcrumed on the carriage and having a wedge-shaped block for engagement with the said arms, to close the nut members upon the lead-screw, a locking device for the said hand-lever and carried by the said carriage, and means for tripping the said locking device to unlock the said lever and allow the nut members to open, as set forth.

14. A machine for cutting wooden dishes, having a carriage for holding a wooden block, a lead-screw, a sectional nut for engaging the lead-screw and having its members pivoted on the carriage and formed with extension-arms, a hand-lever fulcrumed on the carriage and having a wedge-shaped block for engagement with the said arms, to close the nut members upon the lead-screw, and a spring connecting the said arms with each other, to open the nut members when the said wedge-shaped block moves out of engagement with the said arms, substantially as shown and described.

In testimony whereof I have signed my name to this specification in the presence of two subscribing witnesses.

GEO. A. ENSIGN.

Witnesses:
   GEO. D. DEATRICH,
   C. H. KITTENING.